US009353756B2

(12) United States Patent
Piskorz et al.

(10) Patent No.: US 9,353,756 B2
(45) Date of Patent: May 31, 2016

(54) METHOD FOR THE CONTROLLING AND FEEDING OF A POWER PLANT AND POWER PLANT

(71) Applicants: Waldemar Piskorz, Kodeń (PL); Tomasz Tadeusz Piskorz, Kodeń (PL)

(72) Inventors: Waldemar Piskorz, Kodeń (PL); Tomasz Tadeusz Piskorz, Kodeń (PL)

(73) Assignees: Waldermar Piskorz (PL); Tomasz Tadeusz Piskorz (PL)

( * ) Notice: Subject to any disclaimer, the term of this patent is extended or adjusted under 35 U.S.C. 154(b) by 258 days.

(21) Appl. No.: 14/347,485

(22) PCT Filed: Sep. 27, 2012

(86) PCT No.: PCT/PL2012/000096
§ 371 (c)(1),
(2) Date: Mar. 26, 2014

(87) PCT Pub. No.: WO2013/048268
PCT Pub. Date: Apr. 4, 2013

(65) Prior Publication Data
US 2014/0238020 A1 Aug. 28, 2014

(30) Foreign Application Priority Data

Sep. 27, 2011 (PL) .................................. 396453

(51) Int. Cl.
| F01K 13/02 | (2006.01) |
| F04D 25/04 | (2006.01) |
| F03D 9/02 | (2006.01) |
| F02C 6/16 | (2006.01) |
| F03B 13/06 | (2006.01) |
| F03D 9/00 | (2016.01) |

(52) U.S. Cl.
CPC . *F04D 25/04* (2013.01); *F02C 6/16* (2013.01); *F03B 13/06* (2013.01); *F03D 9/001* (2013.01);
(Continued)

(58) Field of Classification Search
CPC ......... F04D 25/04; F03D 9/001; F03D 9/028; F03B 13/06; F02C 6/16; Y02E 60/17; Y02E 10/72; Y02E 60/15; F05D 2220/72
USPC ............................................ 60/660, 664, 667
See application file for complete search history.

(56) References Cited

U.S. PATENT DOCUMENTS 2,591,892 A * 4/1952 Townshend ............. F01L 13/08
123/179.7
3,801,793 A 4/1974 Goebel
(Continued)

FOREIGN PATENT DOCUMENTS

| CH | 329874 A | 5/1958 |
| DE | 2102770 A1 | 8/1972 |

(Continued)

OTHER PUBLICATIONS

International Search Report for PCT/PL2012/000096.

*Primary Examiner* — Hoang Nguyen
(74) *Attorney, Agent, or Firm* — Westman, Champlin & Koehler P.A.; Z. Peter Sawicki; Amanda M. Prose

(57) ABSTRACT

The subject of the invention is a method for the controlling and feeding of power plants, in particular coal fired power plants comprising a steam turbine connected to a turbogenerator. The method consists in that in periods of low power consumption the power is transferred from the turbine shaft to a compressor and the air compressed therein is pumped by compressors to the tanks of a compressed air terminal until a pressure close to the pressure of steam fed to turbine blades is reached. When energy demand increases, compressed air from the tanks is fed through nozzles onto the turbine blades along with superheated steam produced in a boiler. The subject of the invention is also a system for collecting compressed air and feeding it to the turbine.

8 Claims, 1 Drawing Sheet

(52) U.S. Cl.
CPC ............ *F03D 9/028* (2013.01); *F05D 2220/72* (2013.01); *Y02E 10/72* (2013.01); *Y02E 60/15* (2013.01); *Y02E 60/17* (2013.01)

(56) References Cited

U.S. PATENT DOCUMENTS

2002/0153178 A1* 10/2002 Limonius ................ F03D 9/002 180/2.2

2011/0005228 A1* 1/2011 Yoshinari ................ F01D 15/08 60/716
2011/0030373 A1* 2/2011 Brookman ............. F01K 15/02 60/646

FOREIGN PATENT DOCUMENTS

| | | | |
|---|---|---|---|
| GB | 1266830 A | 3/1972 | |
| GB | 1442632 A | 7/1976 | |

* cited by examiner

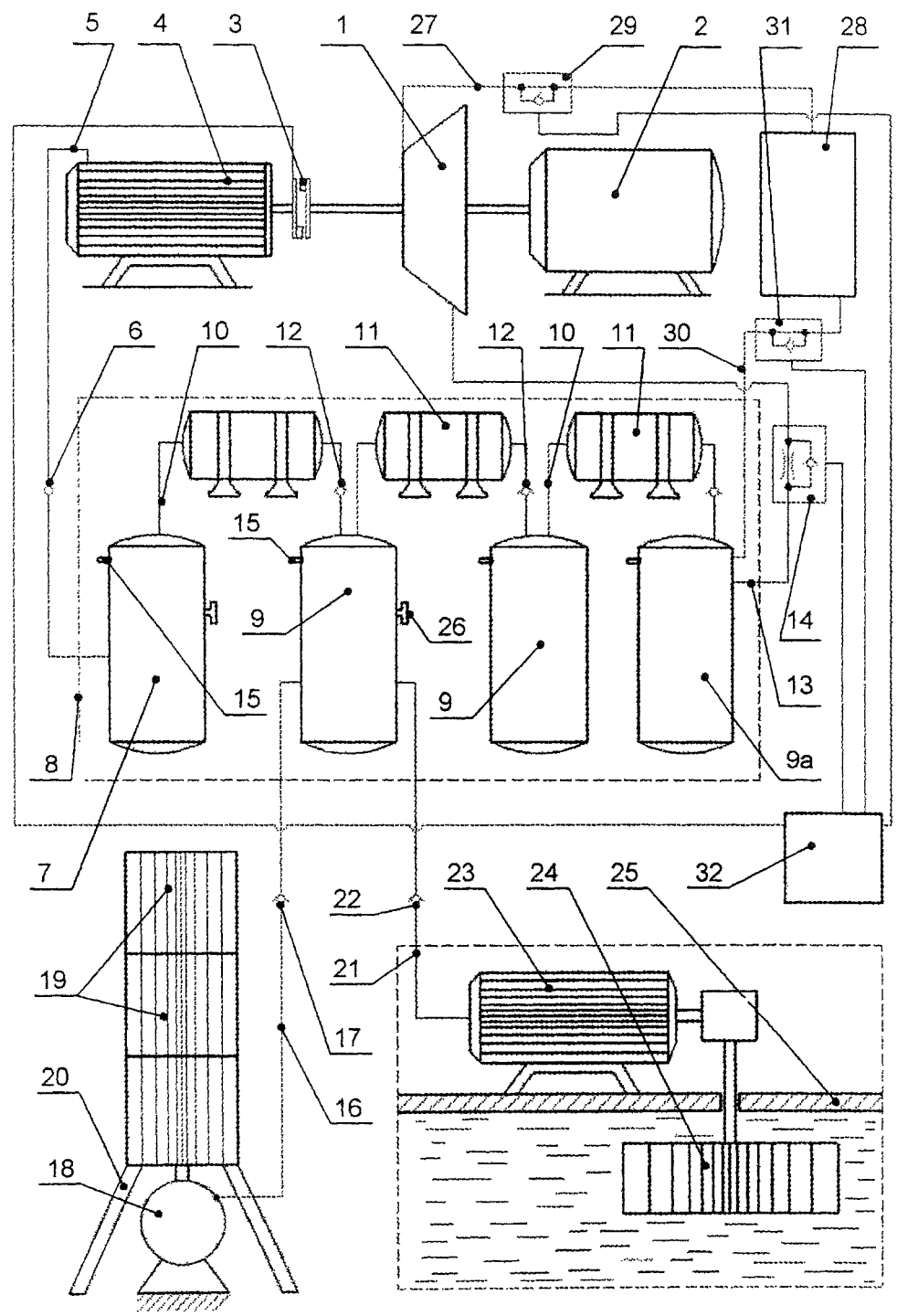

METHOD FOR THE CONTROLLING AND FEEDING OF A POWER PLANT AND POWER PLANT

CROSS-REFERENCE TO RELATED APPLICATION

This Application is a Section 371 National Stage Application of International Application No. PCT/PL2012/000096, filed Sep. 27, 2012, and published as WO/2013/048268 on Apr. 4, 2013, in English, which claims priority to and benefits of Polish Patent Application No. P-396453, filed Sep. 27, 2011, the contents of which are hereby incorporated by reference in their entirety.

The subject of the present invention is a method for the controlling and feeding of power plants, especially coal-fired plants, and a system for the controlling and feeding of power plants, especially coal-fired power plants.

Known in the art are pumped storage power plants in which electric energy is converted to gravitational potential energy by pumping water from a lower elevation reservoir to a higher elevation reservoir in a period of surplus production capacity over electric power demand. The power surplus, which must be maintained during the night, would be lost permanently were it not be stored by pumped storage power stations in the form of potential energy of water.

A method according to the present invention for the controlling and feeding of a power plant, especially coal-fired power plant comprising a steam turbine connected to a turbogenerator, consists in that in periods of low consumption the surplus energy is transferred, via a then-operated (on-off) electroreducer or coupling, to an air compressor. Compressed air obtained from that surplus energy is sent to tanks of a compressed air terminal, and then pressurized by subsequent compressors and transferred to subsequent tanks until high pressure is reached there, said pressure being close to the pressure of steam directed to the turbine. In periods of increased power consumption, compressed air is fed through nozzles to guide vanes of at least one turbine stage or segment, along with steam produced by a boiler. Depending on the demand for energy, the amount of air to be fed is controlled by means of an electronic circuit-controlled throttle valve, coupled with a power consumption recording system. At the same time, compressed air is supplied from the terminal to the boiler combustion chamber.

Additionally, the tanks of the compressed air terminal are connected to compressors coupled with wind farm turbines and the air thus obtained is stored for use in periods of peak demand for electric energy.

Where a power plant is located in the vicinity of flowing water, or aquifers with flowing masses of water, the tanks of the terminal are preferably fed with air coming from compressors driven by water turbines.

The share of steam to drive the turbine is reduced depending on the amount of compressed air collected and the amounts of compressed air supplied from external sources, until the steam is completely replaced by compressed air.

The subject of the present invention is also a system for feeding of a power plant.

The system for feeding of a power plant consists in that the shaft of a multi-stage steam & air turbine is coupled via an electromagnetic clutch or a electroreducer with the compressors whose discharge ducts are connected through check valves to compressed air surge tanks which are part of a compressed air plant terminal. The tanks are fitted with pressure sensors and interconnected with pipelines, with compressors and check valves located in the pipelines. The final compressed air tank is connected, via a pipeline equipped with a throttling valve, to nozzles installed in each segment or compression stage of the turbine. Compressor supply lines, throttle valves, pressure sensors in the tanks, electromagnetic clutch or electroreducer are connected to an electronic control system of the turbine governing the supply of steam and compressed air to the turbine depending on the demand for electric energy.

Preferably, at least one compressor coupled with a wind turbine is connected to the tanks of the compressed air terminal.

Preferably, at least one compressor coupled with a water turbine installed in a natural watercourse is connected to the tanks of the terminal. Additionally, the terminal tanks are equipped with pipe stubs with valves to connect mobile compressed air tank cars.

The method according to the present invention makes it possible to accumulate energy in periods of surplus energy generation in power stations where there are no natural conditions to create two reservoirs situated close to each other and at different elevations. This method is characterized by high efficiency, and if the site location is convenient, feeding fuel to the power plant becomes unnecessary since the turbine can be fed with compressed air generated using wind and water energy.

EXAMPLE

When energy surplus occurs, the main compressor is connected to a turbine power takeoff shaft, from which compressor the compressed air is sent to one of the currently unfilled tanks in the compressed air terminal. Next, by means of successive compressors, compressed air is pumped through to successive tanks, in which it is collected at increasingly higher pressures. In the final tank, from which the air is fed to the power plant, its pressure is approximately equal to the pressure of steam fed to turbine vanes. When the demand for energy increases, the main compressor is automatically disconnected. The other compressors, installed between the air tanks, pump the air to the tanks of the terminal until the designated pressure is reached, as indicated by pressure sensors. In case that energy demand increases while ample amount of air is connected, the compressed air is fed to the nozzles installed at least one turbine stage, until the demand for energy falls or the pressure drops in the final tank of the terminal. Depending on turbine load, the number of nozzles the compressed air is fed to is increased or decreased. The tanks of the compressed air terminal are also connected to compressors coupled with wind turbines. The air is compressed in each subsequent tank until the nominal pressure of turbine feed steam is reached. After reaching a surplus of air supplied to the terminal of air over the amount required to power a steam turbine, the steam feed is closed and the turbine operates on compressed air only. Where the compressed air feed is stable, the boiler is shut down.

The system according to the present invention is illustrated in the figure showing a diagram of connections of the system's units.

The shaft of a multi-stage steam & air turbine 1 driving a turbogenerator 2 is connected via an electromagnetic clutch 3 to a compressor 4 whose discharge conduit 5 is connected via a check valve 6 to a compressed air surge tank 7 which part of a compressed air plant terminal 8. The compressed air tanks 7, 9 and 9a are interconnected by pipelines 10 equipped with compressors 11 and check valves 12. The feed tank 9a is connected by pipeline 13 equipped with a solenoid throttling valve 14 which conveys the compressed air through nozzles onto the guide vanes of the respective stages of the steam & air turbine 1. Pressure sensors 15 are installed in tanks 7, 9 and 9a. One of the compressed air tanks 9 is connected, via a pipeline 16 equipped with a check valve 17, to a compressor 18 which is coupled with wind turbines 19 stacked into a tower 20. Also connected to the compressed air tank 9, via a pipeline 21 equipped with a check valve 22, is a compressor 23 coupled with a water turbine installed on a platform 25 anchored at a watercourse. Additionally, the tanks 9 of the terminal 8 are equipped with nozzles 26 to connect mobile compressed air tank cars. The steam & air turbine 1 is connected via a steam manifold 27 to the vaporiser of a high pressure boiler 28. A solenoid throttling valve 29 is located between the boiler 28 and the turbine 1. The combustion chamber of the boiler 28 has an air feed pipe 30 attached to it, said pipe connected to the compressed air tank 9a of the compressed air terminal 8 and equipped with a throttling valve 31. The electromagnetic clutch 3, compressors 4 and 11, throttle valves 14, 29 and 31, and sensors 15 are coupled with a central control system 32, included in the power consumption recording system of the turbogenerator 2.

The invention claimed is:

1. A method for the controlling and feeding of power plants, comprising coal fired power plants with a steam turbine connected to a turbogenerator, characterized in that that in periods of low power consumption power is transferred from the turbine shaft via an on-off clutch onto at least one air compressor, and the air compressed by it is sent to tanks of a compressed air terminal, and then the air is further compressed in subsequent tanks until a pressure close to the pressure of steam fed to the turbine blades is reached, whereas in case of increased power consumption the compressed air is fed through nozzles to the blades of at least one turbine stage along with steam produced by a boiler, whereas the amount of air to be fed is controlled by means of a throttle valve controlled by an electronic circuit coupled with a power consumption recording system.

2. The method for the controlling and feeding of power plants according to claim 1, characterized in that at least one compressor coupled with a wind turbine is connected to a tank of the compressed air terminal.

3. The method for the controlling and feeding of power plants according to claim 1, characterized in that at least one compressor coupled with a water turbine is connected to a tank of the compressed air terminal.

4. The method for the controlling and feeding of power plants according to claim 1, characterized in that compressed air is supplied from the terminal to the boiler combustion chamber.

5. A system for the controlling and feeding of power plants, comprising coal fired power plants comprising a steam turbine connected to a turbogenerator, characterized in that the shaft of a multi-stage steam & air turbine is connected via a clutch to a compressor whose discharge conduit is connected through a check valve to a compressed air surge tank, said surge tank being part of a compressed air terminal composed of tanks and interconnected with pipelines equipped with compressors and check valves, whereas tank is linked via a pipeline equipped with a throttle valve, with an inlet of the operating medium to nozzles installed in the steam turbine, and in addition, each system device governing the flow of air is connected to an automatic control system.

6. The system for the controlling and feeding of power plants according to claim 4, characterized in that at least one compressor coupled with wind turbines is connected to the tanks of the terminal.

7. The system for the controlling and feeding of power plants according to claim 4, characterized in that a compressor coupled with a water turbine is connected to the tanks of the terminal.

8. The system for the controlling and feeding of power plants according to claim 4, characterised in that the tanks are equipped with pipe stubs to connect mobile tank cars.

\* \* \* \* \*